(12) United States Patent
Ishioka

(10) Patent No.: US 12,294,431 B2
(45) Date of Patent: May 6, 2025

(54) WIRELESS COMMUNICATION DEVICE

(71) Applicant: Mitsubishi Electric Corporation, Tokyo (JP)

(72) Inventor: Kazuaki Ishioka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 97 days.

(21) Appl. No.: 18/235,692

(22) Filed: Aug. 18, 2023

(65) Prior Publication Data

US 2023/0396297 A1    Dec. 7, 2023

Related U.S. Application Data

(63) Continuation of application No. PCT/JP2021/008347, filed on Mar. 4, 2021.

(51) Int. Cl.
*H04B 7/06*  (2006.01)
*H04B 7/08*  (2006.01)

(52) U.S. Cl.
CPC ......... *H04B 7/0617* (2013.01); *H04B 7/0828* (2013.01)

(58) Field of Classification Search
CPC .. H04B 7/0617; H04B 7/0828; H04B 7/0691; H04B 7/06952; H04B 7/0608; H01Q 1/2283; H01Q 21/08
See application file for complete search history.

(56) References Cited

U.S. PATENT DOCUMENTS

| | | | |
|---|---|---|---|
| 10,910,695 B2 | 2/2021 | Tezuka | |
| 2012/0307695 A1 | 12/2012 | Yehezkely et al. | |
| 2014/0072066 A1 | 3/2014 | Lindoff et al. | |
| 2015/0215793 A1* | 7/2015 | Siomina | H04W 64/00 455/456.1 |
| 2023/0291443 A1* | 9/2023 | Abedini | H04W 52/0219 |

FOREIGN PATENT DOCUMENTS

| | | |
|---|---|---|
| JP | 2016-536818 A | 11/2016 |
| JP | 2020-43537 A | 3/2020 |
| WO | WO 2020/141987 A1 | 7/2020 |

OTHER PUBLICATIONS

"3rd Generation Partnership Project; Technical Specification Group Radio Access Network; NR; Physical channels and modulation (Release 16)", 3GPP TS 38.211 V16.3.0, Sep. 2020, pp. 1-133.
International Search Report for PCT/JP2021/008347 mailed on May 11, 2021.
Mohammed et al., "Single-User Beamforming in Large-Scale MISO Systems with Per-Antenna Constant-Envelope Constraints: The Doughnut Channel", IEEE Transactions on Wireless Communications, vol. 11, No. 11, Nov. 2012, pp. 3992-4005, total 16 pages.
Extended European Search Report for European Application No. 21929041.8, dated Mar. 1, 2024.

* cited by examiner

*Primary Examiner* — David S Huang
(74) *Attorney, Agent, or Firm* — BIRCH, STEWART, KOLASCH & BIRCH, LLP

(57) ABSTRACT

A base station as a wireless communication device that performs multicarrier transmission with a plurality of terminals includes: a plurality of on-chip array antennas that transmits a constant envelope modulated signal; and a control device that controls directions and bandwidths of beams of the plurality of on-chip array antennas and allocates the on-chip array antennas that transmit and receive signals to and from the terminals.

1 Claim, 3 Drawing Sheets

WIRELESS COMMUNICATION DEVICE

CROSS-REFERENCE TO RELATED APPLICATION

This application is a continuation application of International Application PCT/JP2021/008347, filed on Mar. 4, 2021, and designating the U.S., the entire contents of which are incorporated herein by reference.

BACKGROUND OF THE INVENTION

1. Field of the Invention

The present disclosure relates to a wireless communication device that performs multicarrier transmission.

2. Description of the Related Art

Cellular wireless communication requires widening of a wireless bandwidth for increasing communication capacity, reducing transmission delay, and the like, but with an existing frequency band being crowded, a higher frequency band has been exploited. The fifth generation mobile communication system (hereinafter referred to as 5th Generation (5G)) newly uses the 28 GHz band. While a propagation loss increases in proportion to a square of the frequency, transmit power cannot be increased without limitation due to heat generated in a transmit amplifier, cost restrictions, and the like. In addition, required transmit power also increases in proportion to an increase in the bandwidth. Therefore, the 5G adopts a system of increasing an antenna gain by an array antenna.

As the frequency increases, the size of the antenna decreases in inverse proportion to the frequency, and the antenna gain per area by the array antenna increases in proportion to the square of the frequency. Therefore, when the array antenna is used for both transmission and reception, the gain of the transmission and reception together increases in proportion to a fourth power of the frequency, which is an effect that more than compensates for the propagation loss and the increase in power due to the widening of the bandwidth. The increase in the antenna gain is equivalent to using a narrow beam with high directivity. The 5G uses an antenna capable of electronically controlling a beam direction, such as a phased array antenna, and performs communication while constantly controlling the beam direction in both transmission and reception. Moreover, since the beam formed by the array antenna is narrow, the 5G implements multi-user multiple input and multiple output (MIMO) in which user separation is performed using differences in the direction of a plurality of users, and communication is simultaneously performed at the same frequency and the same time. The 5G uses, as a modulation scheme, orthogonal frequency division multiplexing (OFDM) that is multicarrier transmission resistant to a multipath channel. Specifications of a physical layer in the 5G are disclosed in Non Patent Literature 1 to 3GPP TS 38.211 V16.3.0 (2020-09).

In the future, a sixth generation mobile communication system (hereinafter referred to as 6th Generation (6G)), a seventh generation mobile communication system (hereinafter referred to as 7th Generation (7G)), and the like are also expected to achieve an increase in the communication capacity, a reduction in the transmission delay, and the like by a similar method, and utilize a terahertz band of frequencies higher than those of the 5G, that is, 100 GHz to several THz. In this case, the size of one array antenna is about the same as that of an integrated circuit (IC) chip, and an on-chip array antenna in which an antenna, an amplifier, a phase shifter, and the like are integrated is likely to be used. The on-chip array antenna is disclosed in Japanese Patent Application Laid-open No. 2020-43537, for example. Total throughputs of 100 Gbps or more for the 6G and 1 Tbps or more for the 7G are expected to be required, and the implementation thereof is expected to rely heavily on multi-user MIMO with several tens to several hundreds of the on-chip array antennas.

In a case where the on-chip array antenna is used in the terahertz band, heat generated in a transmit amplifier becomes a problem. The communication using the existing OFDM as disclosed in Non Patent Literature 1 to 3GPP TS 38.211 V16.3.0 (2020-09) has had a problem that envelope fluctuations are severe, sufficient transmit power cannot be obtained due to the heat generated, the coverage is reduced, and the throughput is reduced to cause an increase in the delay. The communication is prone to multipath due to the increase in the bandwidth, and even in a case where constant envelope modulation by a single carrier with high amplifier efficiency is used, there has been a problem that the coverage is reduced due to the multipath channel, and the throughput is reduced to cause an increase in the delay.

SUMMARY OF THE INVENTION

In order to solve the above-described problems and achieve the object, a wireless communication device according to the present disclosure performs multicarrier transmission with a plurality of terminals. The wireless communication device includes: a plurality of on-chip array antennas to transmit a constant envelope modulated signal; and a control device to control direction and bandwidth of a beam of the plurality of on-chip array antennas and allocate the on-chip array antennas that transmit and receive a signal to and from the terminals.

DETAILED DESCRIPTION OF THE PREFERRED EMBODIMENTS

Hereinafter, a wireless communication device according to an embodiment of the present disclosure will be described in detail with reference to the drawings.

Embodiment

Figure 1:
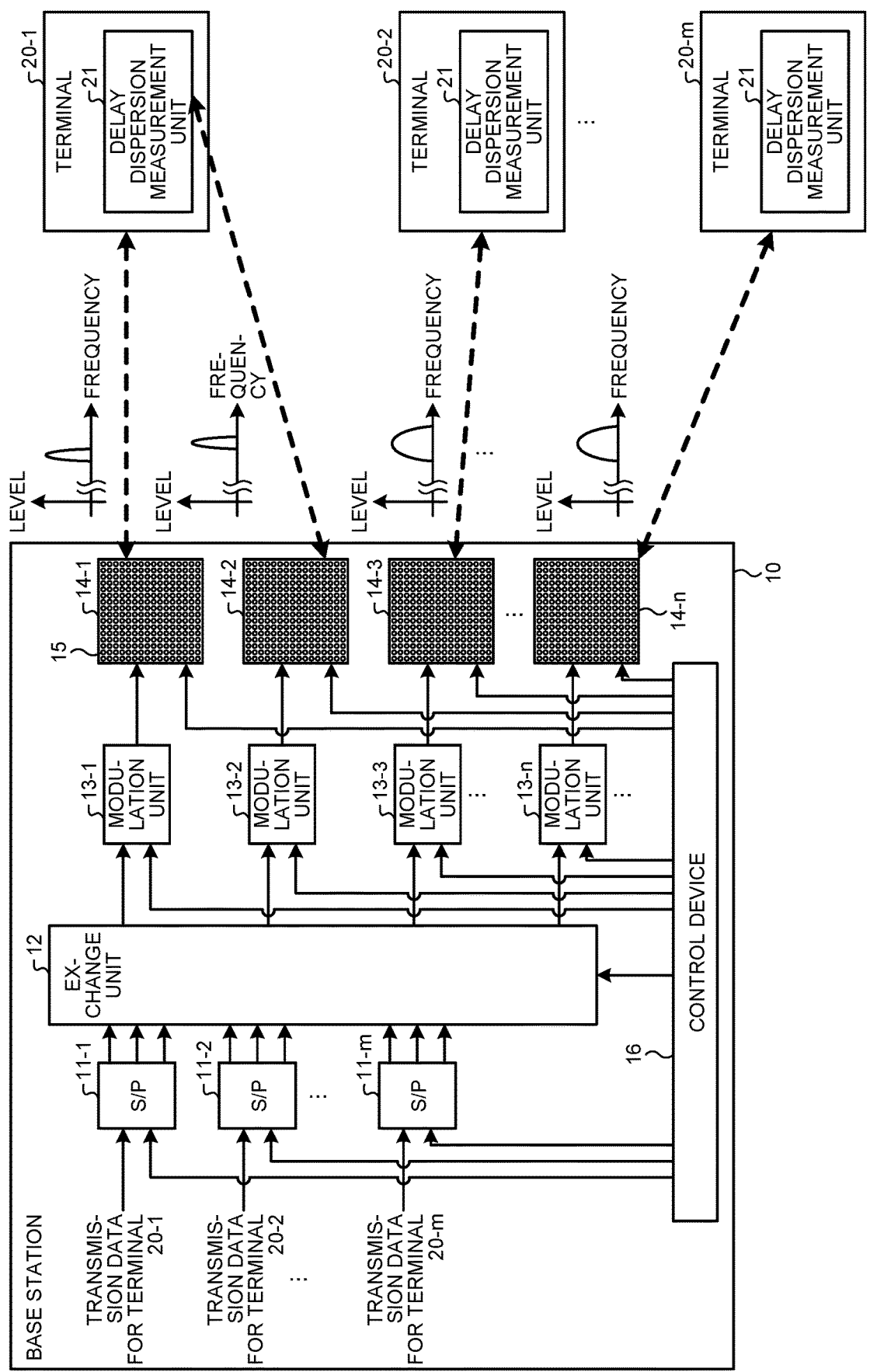
FIG. 1 is a block diagram illustrating an example of a configuration of a base station according to the present embodiment.

FIG. 1 is a block diagram illustrating an example of a configuration of a base station 10 according to the present embodiment. The base station 10 includes serial-to-parallel conversion units 11-1 to 11-*m*, an exchange unit 12, modulation units 13-1 to 13-*n*, on-chip array antennas 14-1 to 14-*n*, and a control device 16. The base station 10 is a wireless communication device capable of performing wireless communication, specifically, multicarrier transmission with a plurality of terminals 20-1 to 20-*m* using the plurality of on-chip array antennas 14-1 to 14-*n*. FIG. 1 illustrates a flow of an operation in a case where pieces of transmission data are transmitted from the base station 10 to the terminals 20-1 to 20-*m*. In the following description, the serial-to-parallel conversion units 11-1 to 11-*m* may be referred to as serial-to-parallel conversion units 11 when not distinguished, the modulation units 13-1 to 13-*n* may be referred to as modulation units 13 when not distinguished, the on-chip array antennas 14-1 to 14-*n* may be referred to as on-chip array antennas 14 when not distinguished, and the terminals 20-1 to 20-*m* may be referred to as terminals 20 when not distinguished. Note that the base station 10 may be a wireless communication device in the form of a radio unit (RU).

The base station 10 acquires the pieces of transmission data for the terminals 20 from a host device or the like not illustrated, and holds the pieces of transmission data. In order to perform multicarrier transmission of these pieces of transmission data, the serial-to-parallel conversion units 11 perform serial-to-parallel conversion on the transmission data for the terminals 20 under the control of the control device 16. The number of pieces of the transmission data after conversion by the serial-to-parallel conversion units 11, that is, the number of parallels, is the number of carriers to be used for the corresponding terminals 20, and is also the number of the on-chip array antennas 14 allocated to each of the terminals 20. In the serial-to-parallel conversion units 11, the number of parallels is controlled by the control device 16. FIG. 1 illustrates an example in which two carriers are allocated to the terminal 20-1, one carrier is allocated to the terminal 20-2, . . . , and one carrier is allocated to the terminal 20-*m*. The control device 16 controls the number of carriers to be allocated to each of the terminals 20 on the basis of an amount of the transmission data for each of the terminals 20 or the like, but may dynamically change the number of carriers to be allocated to each of the terminals 20. The serial-to-parallel conversion units 11 output the parallel transmission data obtained after conversion to the exchange unit 12. Note that FIG. 1 illustrates the serial-to-parallel conversion unit as serial/parallel (S/P) in order to simplify the description.

The exchange unit 12 outputs the transmission data acquired from the serial-to-parallel conversion units 11 to the corresponding modulation units 13 under the control of the control device 16.

The modulation units 13 perform constant envelope modulation such as minimum shift keying (MSK) or Gaussian minimum shift keying (GMSK) on the transmission data acquired from the exchange unit 12. At this time, the modulation bandwidth, that is, the symbol rate is controlled by the control device 16. The modulation units 13 output the modulated transmission data to the on-chip array antennas 14 connected.

The on-chip array antennas 14 transmit the constant envelope modulated signals, specifically, the modulated transmission data acquired from the modulation units 13, to the terminals 20 as radio waves. The on-chip array antennas 14 each incorporate a mixer, a local oscillator, and the like not illustrated. The on-chip array antennas 14 up-convert the acquired modulated transmission data to designated frequencies under the control of the control device 16, and emit the radio waves in directions of the terminals 20 designated. The on-chip array antennas 14 each are a phased array antenna, include a plurality of antenna elements 15, and include a phase shifter and a transmit amplifier for each of the antenna elements 15. The on-chip array antennas 14 emit beamformed radio waves by adjusting the phase of each of the antenna elements 15 in a direction designated by the control device 16.

The control device 16 controls directions and bandwidths of beams of the on-chip array antennas 14, and allocates the on-chip array antennas 14 that transmit and receive signals to and from the terminals 20. Specifically, the control device 16 controls the number of carriers to be used for each of the terminals 20 and the bandwidth per carrier. The control device 16 determines the bandwidth per carrier on the basis of delay dispersion "d" measured by a delay dispersion measurement unit 21 included in each of the terminals 20. The delay dispersion "d" is delay dispersion of a channel between the base station 10 and the terminal 20. When the length of one symbol is shorter than the delay dispersion "d", deterioration occurs due to intersymbol interference so that the control device 16 controls the bandwidth per carrier to achieve a symbol interval greater than the delay dispersion "d". The control device 16 determines the number of carriers to be used for each of the terminals 20 on the basis of throughput to be transmitted and the bandwidth of one carrier. That is, the control device 16 controls the number of the on-chip array antennas 14 allocated to each of the terminals 20 using the delay dispersion "d". The number of carriers to be used for a certain one of the terminals 20 is the number of the modulation units 13 and the on-chip array antennas 14 used in the base station 10 for that terminal 20. When allocating a plurality of carriers to a certain one of the terminals 20 by multicarrier transmission, the control device 16 performs allocation to adjacent frequencies. Note that, since the direction is different for each of the terminals 20, the control device 16 can perform transmission simultaneously to the different terminals 20 at the same frequency.

As described above, the terminals 20 each include the delay dispersion measurement unit 21 that measures the delay dispersion "d". The delay dispersion measurement unit 21 measures the delay dispersion "d" by using a reference signal that is periodically transmitted from the base station 10. The delay dispersion "d" is defined by the following expression (1), for example. In expression (1), "t" represents time, and "f(t)" is a power delay profile and is a power value of a channel impulse response obtained from the reference signal received.

Formula 1

$$d = \sqrt{\frac{\int_{-\infty}^{\infty} f(t)t^2 dt}{\int_{-\infty}^{\infty} f(t)dt} - \left(\frac{\int_{-\infty}^{\infty} f(t)t dt}{\int_{-\infty}^{\infty} f(t)dt}\right)^2} \quad (1)$$

Expression (1) is to calculate a square root of a dispersion value around a centroid position of the power delay profile. The delay dispersion "d" can be calculated by various methods and thus may be obtained by another calculation method as long as a delay spread due to multipath delay is indicated on a timescale. Note that the terminals 20 transmit the delay dispersions "d" measured by the delay dispersion measurement units 21 to the on-chip array antennas 14 that are beamformed toward the terminals 20 themselves. The on-chip array antennas 14 output the delay dispersions "d" received from the terminals 20 to the control device 16. As a result, the control device 16 can acquire the delay dispersions "d" measured by the delay dispersion measurement units 21 of the terminals 20.

Figure 2:
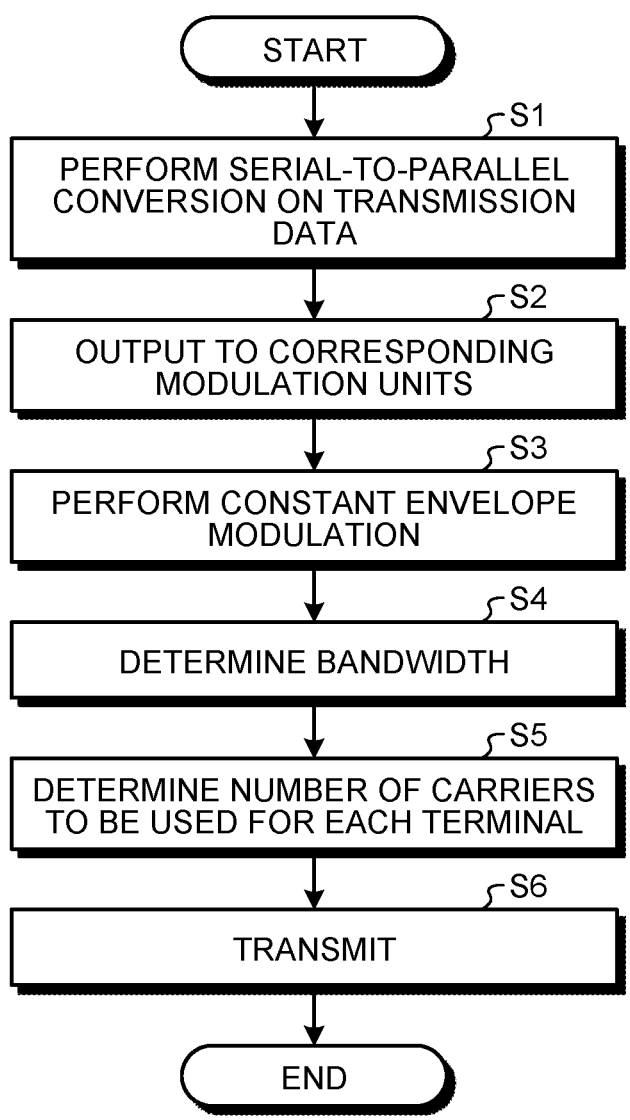
FIG. 2 is a flowchart illustrating an operation of the base station according to the present embodiment.

FIG. 2 is a flowchart illustrating an operation of the base station 10 according to the present embodiment. The serial-to-parallel conversion units 11 perform serial-to-parallel conversion on transmission data for the terminals 20 under the control of the control device 16 (step S1). The exchange unit 12 outputs the transmission data acquired from the serial-to-parallel conversion units 11 to the corresponding modulation units 13 under the control of the control device 16 (step S2). The modulation units 13 perform constant envelope modulation on the transmission data acquired from the exchange unit 12 (step S3). The control device 16 determines a bandwidth per carrier on the basis of delay dispersion "d" (step S4). The control device 16 determines the number of carriers to be used for each of the terminals 20 on the basis of throughput to be transmitted and the bandwidth of one carrier (step S5). The on-chip array antennas 14 transmit the modulated transmission data acquired from the modulation units 13 to the terminals 20 as radio waves under the control of the control device 16 (step S6).

Next, a hardware configuration of the base station 10 will be described. In the base station 10, the on-chip array antennas 14 are the phased array antennas as described above. The serial-to-parallel conversion units 11, the exchange unit 12, the modulation units 13, and the control device 16 are implemented by processing circuitry. The processing circuitry may include a memory storing a program and a processor executing the program stored in the memory, or may include dedicated hardware. The processing circuitry is also called a control circuit.

Figure 3:
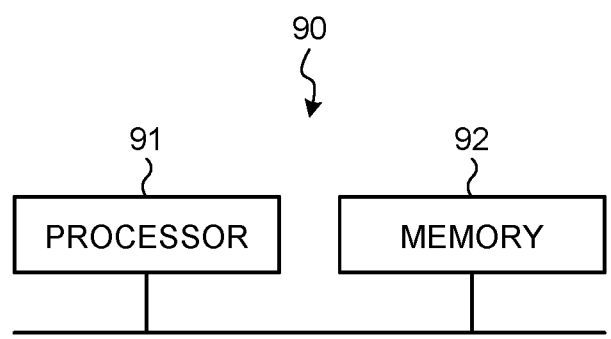
FIG. 3 is a diagram illustrating an example of a configuration of processing circuitry in a case where processing circuitry included in the base station according to the present embodiment is implemented by a processor and a memory.

FIG. 3 is a diagram illustrating an example of a configuration of processing circuitry 90 in a case where the processing circuitry included in the base station 10 according to the present embodiment is implemented by a processor 91 and a memory 92. The processing circuitry 90 illustrated in FIG. 3 is a control circuit and includes the processor 91 and the memory 92. In the case where the processing circuitry 90 incudes the processor 91 and the memory 92, the functions of the processing circuitry 90 are implemented by software, firmware, or a combination of software and firmware. The software or firmware is described as a program and stored in the memory 92. The processing circuitry 90 implements the functions by the processor 91 reading and executing the program stored in the memory 92. That is, the processing circuitry 90 includes the memory 92 for storing the program that results in the execution of the processing of the base station 10. This program can also be said to be a program for causing the base station 10 to execute the functions implemented by the processing circuitry 90. This program may be provided by a storage medium storing the program, or may be provided by other means such as a communication medium.

The above program can also be said to be a program that causes the base station 10 to execute a first step in which the control device 16 controls the directions and bandwidths of the beams of the plurality of on-chip array antennas 14 and a second step in which the control device 16 allocates the on-chip array antennas 14 that transmit and receive signals to and from the terminals 20.

Here, the processor 91 is, for example, a central processing unit (CPU), a processing unit, an arithmetic unit, a microprocessor, a microcomputer, a digital signal processor (DSP), or the like. Moreover, the memory 92 corresponds to, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, a digital versatile disc (DVD), or the like.

Figure 4:
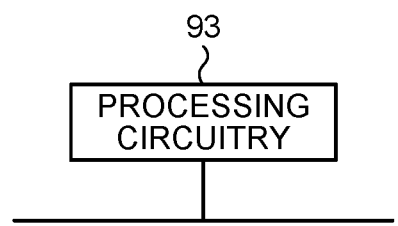
FIG. 4 is a diagram illustrating an example of a configuration of processing circuitry in a case where the processing circuitry included in the base station according to the present embodiment includes dedicated hardware.

FIG. 4 is a diagram illustrating an example of a configuration of processing circuitry 93 in a case where the processing circuitry included in the base station 10 according to the present embodiment includes dedicated hardware. The processing circuitry 93 illustrated in FIG. 4 corresponds to, for example, a single circuit, a complex circuit, a programmed processor, a parallel-programmed processor, an application specific integrated circuit (ASIC), a field programmable gate array (FPGA), or a combination thereof. The processing circuitry 93 may be implemented partly by dedicated hardware and partly by software or firmware. The processing circuitry 93 can thus implement the functions described above by the dedicated hardware, software, firmware, or a combination thereof.

As described above, according to the present embodiment, the base station 10 includes the plurality of on-chip array antennas 14, controls the bandwidth of one carrier on the basis of the delay dispersion "d" measured by the delay dispersion measurement unit 21 of the terminal and controls the number of carriers to be used for each of the terminals 20 on the basis of the throughput to be transmitted and the bandwidth of one carrier. As a result, the base station 10 performs single-carrier constant envelope modulation for each of the on-chip array antennas 14, whereby the efficiency of the transmit amplifier of the on-chip array antenna 14 is improved, and transmission can be performed with high transmit power with low heat generation.

In addition, the base station 10 performs multicarrier transmission using the plurality of on-chip array antennas 14 on the basis of the delay dispersion "d" of the channel and thus can avoid intersymbol interference that occurs in single-carrier transmission even in the multipath channel, thereby being able to improve the total throughput, reduce the delay, and improve the coverage. Moreover, the base station 10 can effectively use the on-chip array antennas 14 by minimizing the number of carriers to be used on the basis of the delay dispersion "d" measured by the terminal 20. The base station 10 can improve the throughput while avoiding or reducing the interference.

The wireless communication device according to the present disclosure has an effect of being able to improve throughput while avoiding or reducing interference.

The configuration illustrated in the above embodiment merely illustrates an example, and thus another known technique can be combined, embodiments can be combined together, or the configuration can be partially omitted and/or modified without departing from the gist thereof.

What is claimed is:

1. A wireless communication device that performs multicarrier transmission with a plurality of terminals, the wireless communication device comprising:
   a plurality of on-chip array antennas to transmit a constant envelope modulated signal; and
   a control circuitry to control direction and bandwidth of a beam of the plurality of on-chip array antennas and allocate the on-chip array antennas that transmit and receive a signal to and from the terminals, wherein
   the control circuitry controls the number of the on-chip array antennas to be allocated to each of the terminals by using delay dispersion of a channel between the wireless communication device and the terminal measured by the terminal.

\* \* \* \* \*